United States Patent [19]

DeSanto

[11] Patent Number: 4,854,037

[45] Date of Patent: Aug. 8, 1989

[54] HOOK AND LOOP HOLDING STRENGTH MAXIMIZING APPARATUS

[76] Inventor: Joseph J. DeSanto, 14 Hillcrest Rd., Belle Mead, N.J. 08502

[21] Appl. No.: 128,105

[22] Filed: Dec. 3, 1987

Related U.S. Application Data

[63] Continuation-in-part of Ser. No. 860,004, May 5, 1986, Pat. No. 4,711,025.

[51] Int. Cl.$^4$ .................. H01R 43/00; A44B 18/00
[52] U.S. Cl. .................................. 29/755; 29/450; 29/760; 24/444; 24/306; 248/205.2
[58] Field of Search .............. 29/868, 745, 755, 760, 29/450; 24/306, 442, 444

[56] References Cited

U.S. PATENT DOCUMENTS 3,576,304  4/1971  Gillemet ........................... 29/450
4,711,025 12/1987  DeSanto .

Primary Examiner—Howard N. Goldberg
Assistant Examiner—Taylor J. Ross
Attorney, Agent, or Firm—Richard C. Woodbridge

[57] ABSTRACT

A pair of displacement levers maximize the holding strength of hook and loop attachment devices. A first piece of hook or loop material is firmly attached to a platform. The material attached to the platform is complementary to and mateable with material attached to the other surface. The displacement levers are rotatable and connected to both ends of the platform. Rotation of the levers causes the leg sections thereof to displace the platform. This causes the hook and loop materials to move in opposite directions thereby firmly setting the hooks and loops with respect to each other and placing them in tension. Wire holding posts attached to the platform on the side opposite from the hook or loop material are used to form bends or corners in wire harnesses on wire harness forming boards. Holding devices such as clothes hooks, clamps, rings, etc. could also be attached to the platform so that other items can be supported by the device. The displacement levers can be replaced by machine screws in an alternative embodiment.

10 Claims, 9 Drawing Sheets

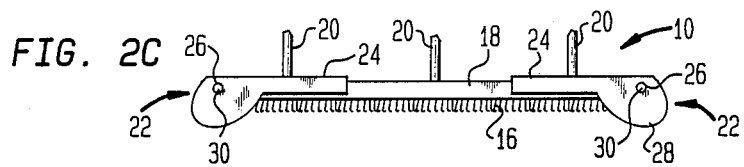
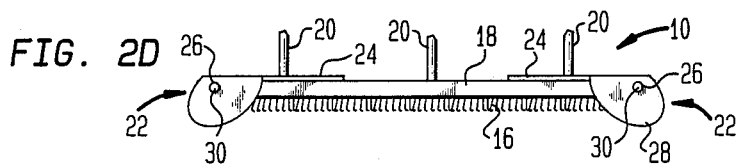
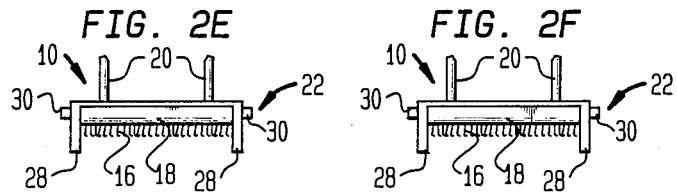
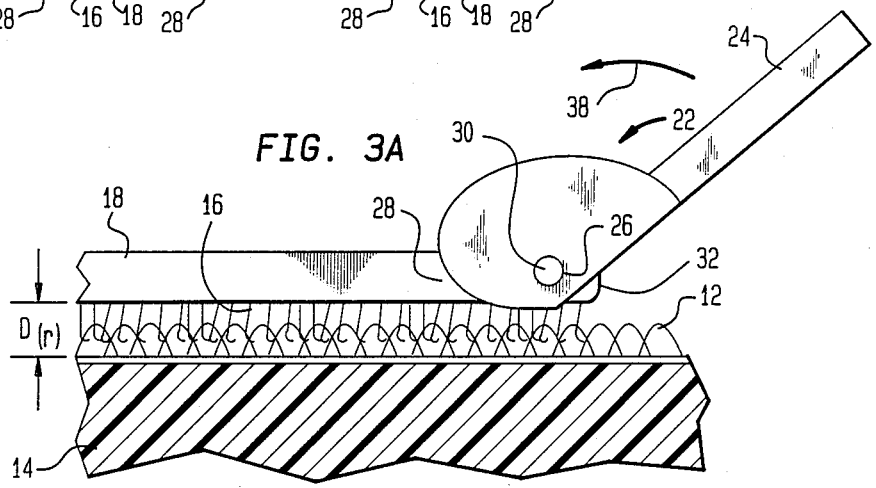
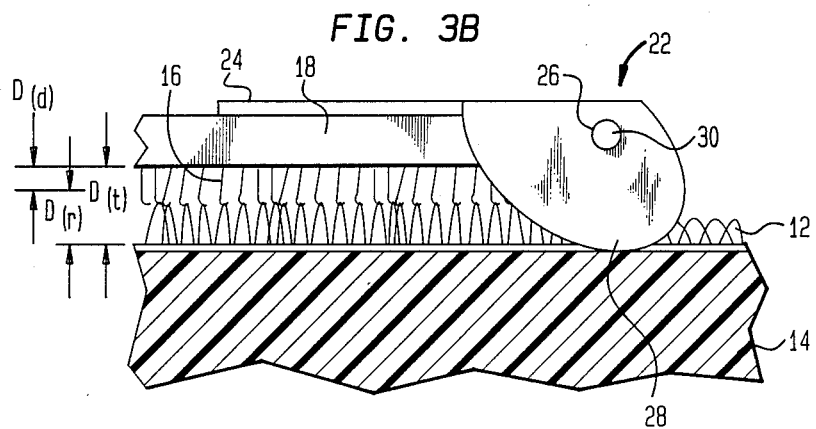

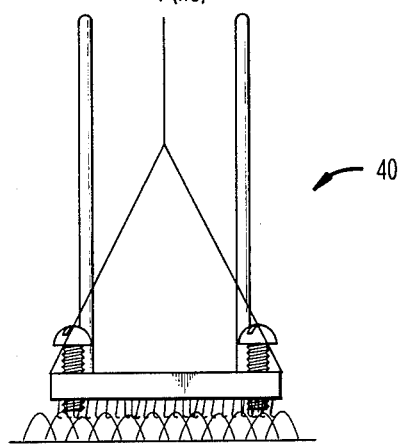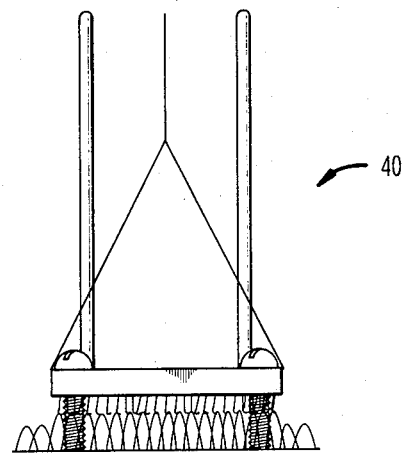

4,854,037

HOOK AND LOOP HOLDING STRENGTH MAXIMIZING APPARATUS

CROSS REFERENCE TO RELATED APPLICATIONS

This application is a continuation-in-part of my co-pending U.S. patent application Ser. No. 06/860,004 filed May 5, 1986 and entitled METHOD AND APPARATUS FOR FORMING ELECTRICAL HARNESSES the entire text and content of which is hereby incorporated by reference.

BACKGROUND OF THE INVENTION

1. Field of the Invention

The invention relates to an apparatus for maximizing the holding strength of hook and loop devices such as those used in the forming of electrical wire harnesses by pulling wires tightly around a post while forming a breakout or a corner.

2. Description of Related Art

Hook and loop fastening devices are used in a variety of applications to selectively attach one article to another.

One interesting application is described in U.S. Pat. No. 3,469,289 entitled QUICK RELEASE HOOK TAPE which discloses a rotating cam mechanism which can be used to separate hook and loop materials connected to each other. The primary purpose of the invention is to be able to quickly and efficiently cause the two materials to release rather than to improve the holding power of the mated materials. Experience shows that pulling through the loops in this fashion damages (i.e. breaks) the loops rendering the interface useless after 100 such disengagements.

U.S. Pat. No. 4,462,193 discloses an ELEVATOR CAB in which a bolt passes through a panel in such a way as to place hook and loop fasteners in compression.

U.S. Pat. No. 4,553,293 discloses a REUSABLE TYING DEVICE of the sort employing hook and loop material to help keep shoelaces tied U.S. Pat. No. 4,271,566 is of possible relevance in that it describes a device entitled SHEAR ATTACHMENTS USING HOOK AND LOOP FASTENER ELEMENTS. Various attachment modes are disclosed in that reference which employ hook and loop fasteners that are confined in such a manner as to permit engagement and disengagement only in a sidewise direction.

U.S. Pat. No. 3,866,276 entitled SPRING-LOADED BELT KEEPER describes an embodiment in which hook and loop fasteners are kept under compression in order to improve holding capabilities.

Lastly, U.S. Pat. No. 3,658,107 and 4,028,855 describe structural applications for hook and loop fasteners of general interest only.

One prior art technique to increase hook and loop holding strength is to beef up the holding strength of each individual hook. Such devices are sold under the trademark SOFTILES ® and manufactured by Velcro USA, Inc., 406 Brown Avenue, Manchester, N.H. 03108.

Insofar as understood none of the prior art taken either individually or in combination with each other teaches or suggests the novel invention described herein in which hook and loop materials are displaced with respect to each other in such a fashion that their shear holding capabilities substantially increase.

SUMMARY OF THE INVENTION

Briefly described the invention comprises a method and apparatus for significantly increasing the stability engagement and sidewise holding strength of mateable hook and loop materials. According to the preferred embodiment of the invention the device is employed in the context of an electrical wire harness forming board. Hook material is firmly adhesively attached to a platform which supports a plurality of upright wire guiding posts. The upright posts are employed to support the electrical wires where they make a bend. Loop material covers the board and is intended to mate with the hook material connected to the post platform. Lever operated displacement cams are located at opposite ends of the platform.

Initially the user brings the hooks on the bottom side of the post platform into contact with the loops on the board and then twists the platform gently side to side in order to improve mating of the hook and loop material and causing the maximum number of hooks and loops to engage. Next the user rotates the levers downwardly displacing the hook and loop material away from each other thereby placing the hooks and loops under moderate tension. It is believed that more hooks and loops engage in this manner because in the relaxed state many hooks and loops face away from each other and would not naturally engage if put into tension by merely pulling sidewise on the part which creates a moment whose fulcrum is in the center of the part. This creates a rather substantial angle between the planes of the hook and loop materials especially in the case of small parts. Normally about 50% of all, hooks and loops fall away from each other. Therefore unless the hooks and loops are pre-tensioned so they can't disengage, the hooks and loops that normally fail each other will disengage. This is in fact the normal prior art method, i.e. rotation, for separating hook and loop materials. When properly pre-tensioned, according to the teaching of the present invention, the tension is sufficient to keep the hooks and loops engaged but not enough to cause a significant number of hooks and loops to disengage. In the foregoing condition the posts on the platform exhibit substantially increased resistance to forces applies to the side of the posts, i.e. torque resistance. This occurs because the moment area has moved from the center of the part to each outside leg. Any forces applied to the side of the post, i.e. rotating forces will now have to move the material almost vertically in order to disengage it. Therefore, the maximum possible potential strength of the hook and loop material is employed to hold the part. Increased perpendicular holding power has also been noticed. Consequently, the posts are better able to withstand the forces applied to them by wires as they are formed on a wire harness forming board. The mechanism is easily released by rotating the displacement levers back to their original positions thereby relieving the tension of the hook and loop materials with respect to each other. The platform can then be removed by tilting it on its side so that the materials separate from each other.

According to an alternate embodiment it is possible to provide displacement by means of three or four screws located at the corners of the platform. Displacement of the hook and loop materials is created by rotating the screws causing the hook and loop materials to pull away in opposite directions. This duplicates the effect created by the lever operated cams of the preferred embodiment.

The preferred context of the present invention is in the electrical wire harness forming art. However, there are other possible applications such as the use of the device to increase the sidewise holding strength of a clothes hook as might be attached to the vertical surface of a door or wall.

These and other features of the invention will be more fully understood by reference to the following drawings.

BRIEF DESCRIPTION OF THE DRAWINGS

FIG. 2C is a right side elevational view of the preferred embodiment illustrated in FIG. 2A.

FIG. 2D is a left side elevational view of the preferred embodiment illustrated in FIG. 2A.

FIG. 2E is an end view of the preferred embodiment of the invention illustrated in FIG. 2A.

FIG. 2F is an end view of the preferred embodiment illustrated in FIG. 2A opposite from that shown in FIG. 2E.

FIG. 3A is a detail elevational view showing the preferred embodiment of the invention prior to activation of the displacement levers.

FIG. 3B is a detail elevational view of the preferred embodiment of the invention shown in FIG. 3A after the hook and loop displacement levers have been rotated causing the hook and loop materials to be placed under moderate tension.

FIG. 7E illustrates an embodiment of the invention shown in the non-tensioned mode with an upward force applied thereto.

FIG. 7F illustrates an embodiment of the invention similar to that shown in FIG. 7E but under pre-tension with an upward force applied thereto.

DETAILED DESCRIPTION OF THE PREFERRED EMBODIMENT

During the course of this description like numbers will be used to identify like elements according to the different figures which illustrate the invention.

Figure 1:
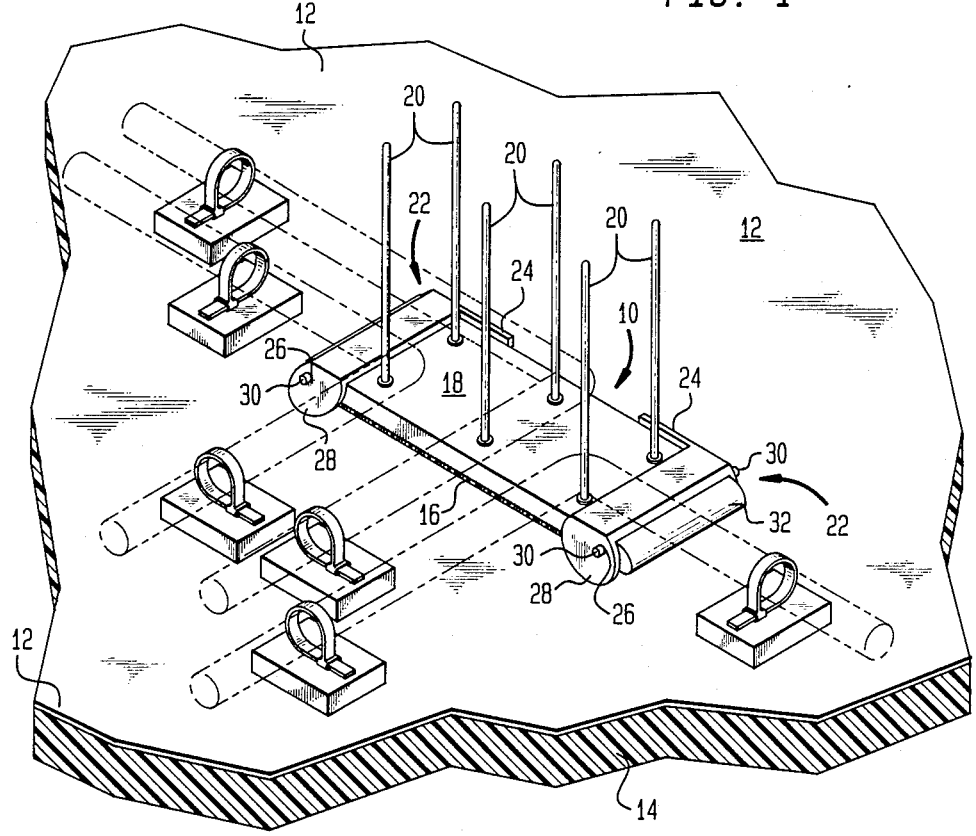
FIG. 1 is a perspective view of the present invention shown in the context of an electrical wire harness forming board.
Figure 2A:
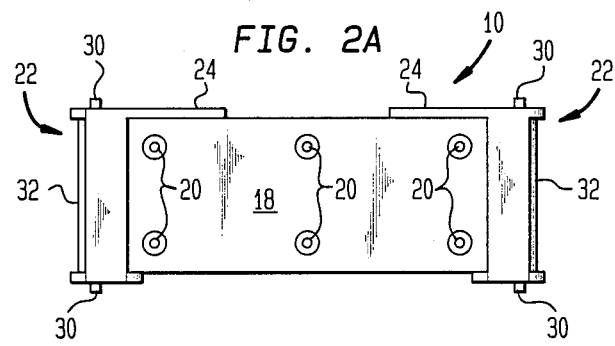
FIG. 2A is a top plan view of the preferred embodiment of the invention.
Figure 2B:
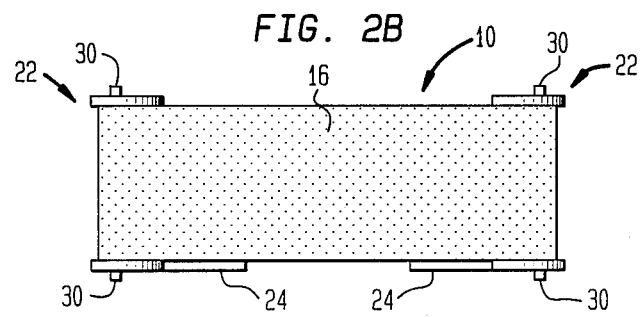
FIG. 2B is a bottom view of the preferred embodiment illustrated in FIG. 2A.

The preferred embodiment of the invention 10 illustrated in FIG. 1 is in the context of an electrical wire harness forming board. Specifically, the invention 10 is appropriate for use on a wiring board such as described in my copending application, Ser. No. 06/860,004 filed May 5, 1986, now U.S. Pat. No. 4,711,025 and entitled METHOD AND APPARATUS FOR FORMING ELECTRICAL HARNESSES, the entire contents and disclosure of which is incorporated herein in total by reference. In my copending application a wiring board is covered with a material which could be either hook or loop type. Complimentary hook or loop material respectively are easily attached to the bottom side of platforms that can be selectively positioned on the wiring board depending upon the configuration desired for the electrical harness. While the invention described in my copending application provides a substantially improved method and apparatus for forming electrical harnesses, it was found that the sidewise forces, i.e. torque, placed upon the elements, would, in some cases cause the part to tip thereby changing wire length or, even worse causing the hook and loop materials to separate. This problem was overcome by use of the present invention 10 in which the sidewise holding power of the positionable platforms was increased sufficiently so that they would not tip or involuntarily separate from the wiring board itself.

As shown in FIG. 1, the invention 10 is adapted to mate with a wiring board 14 covered with loop material 12 such as described in my copending application referred to above. Loop material 14 is engageable with hook material 16 adhesively attached to the underside of platform 18. A plurality of posts 20, in this case six, are attached vertically with respect to the horizontal surface of platform 18.

Details of the improved holding device 10 are shown in the orthogonal views of FIGS. 2A–2F. The two displacement or tensioning levers 22 each include an upper lever arm section 24 and a lower leg section 28. A pivot pin 30 is captured in a turned-down portion 32 of the platform 18 at both ends. Pivot pin 30 passes through an aperture 26 located intermediate lever arm 24 and leg section 28.

FIGS. 3A and 3B illustrate the lever tensioning mechanism 22 in greater detail. In FIG. 3A the lever arm 22 is illustrated in its non-displaced, non-tensioned, relaxed mode. Lever arm 24 points substantially upward in the 12 o'clock position. In this attitude the bottom of the leg section 28 is closest to the bottom of platform 18 and therefore the loop and hook materials 14 and 16 are under least tension. The distance between the platform 18 and the board 14 in the relaxed state is identified as $D_{(r)}$. $D_{(r)}$ may vary greatly because it rests on the loop pile. FIG. 3A shows that the loop and hook materials 12 and 16 are loosely engaged with some of the hooks and loops not making complete useful contact.

FIG. 3B illustrates the mode in which the loop and hook materials 12 and 16 are placed under tension by turning lever arm 24 downwardly, counterclockwise in the direction of arrow 38 to the approximately 9 o'clock position. It will be noted in this mode that the loop and hook materials 12 and 16 are considerably straighter, therefore under tension and that a greater number of loops and hooks 12 and 16 have engaged with each other. The mode illustrated in FIG. 3B differs from conventional attachments in that the maximum number of loops and hooks 12 and 16 are engaged. The invention 10 in this mode also exhibits substantially increased sidewise strength for another reason, namely, that the platform 18 now must rotate around an edge or corner rather than around a point intermediate the edges. This decreases the leverage that would work to the advantage of a force applied sidewise to a post and accordingly increases the sidewise resistance of the platform 18 and anything contacting or attached to post 20. Rotation of arm 24 causes leg 28 to move away from platform 18 thereby moving platform 18 and its attached hook material 16 away from the board 14 by a displacement $D_{(d)}$ to a new tensioned distance $D_{(t)}$. For a hook material, Model No. 65, manufactured by Velcro, U.S.A., Inc., P.O. Box #5218, 408 Brown Avenue, Manchester, N.H. 03108 and a loop material known as Velvet Loop ™ by Design/Craft Fabric Corporation, 727 Oak Park Avenue, Niles, Ill. 60648 the distance $D_{(t)}$ is preferably about 0.25". For other types of loop and hook material 12 and 16 the distance $D_{(t)}$ can vary from $\frac{1}{8}''$ to $\frac{1}{2}''$. According to the preferred embodiment $D_{(d)}$ (i.e. $D_{(r)} - D_{(t)}$) is approximately equal to the radius of the hook portion of the hook material.

FIGS. 4A–4E illustrate the steps preferably employed to engage and disengage the invention 10 from an electrical harness forming board 14.

Figure 4A:
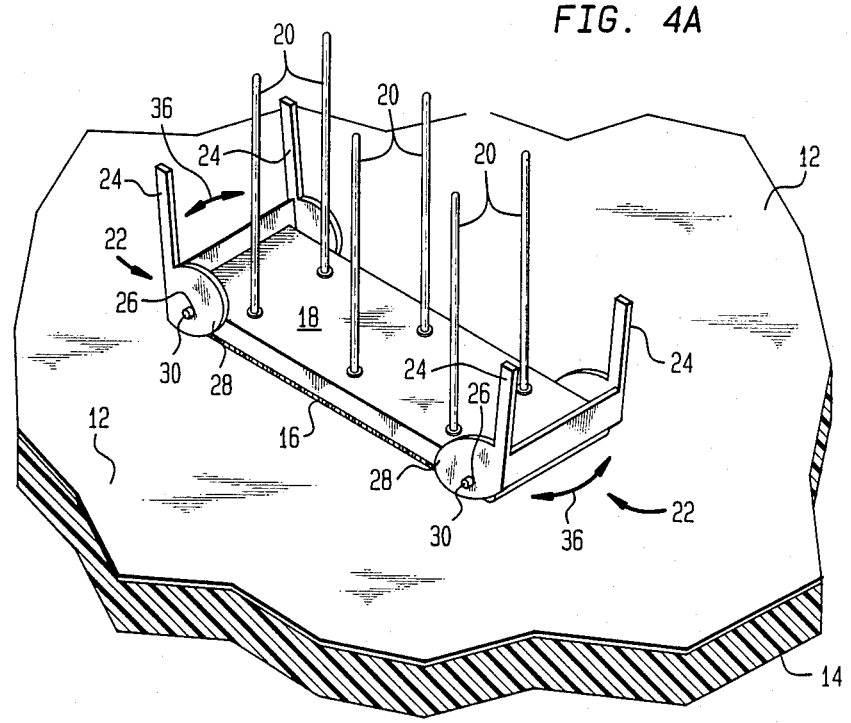
FIG. 4A illustrates the first step of employing the invention where the hook and loop materials are initially brought into contact and twisted slightly to improve engagement contact.
Figure 4B:
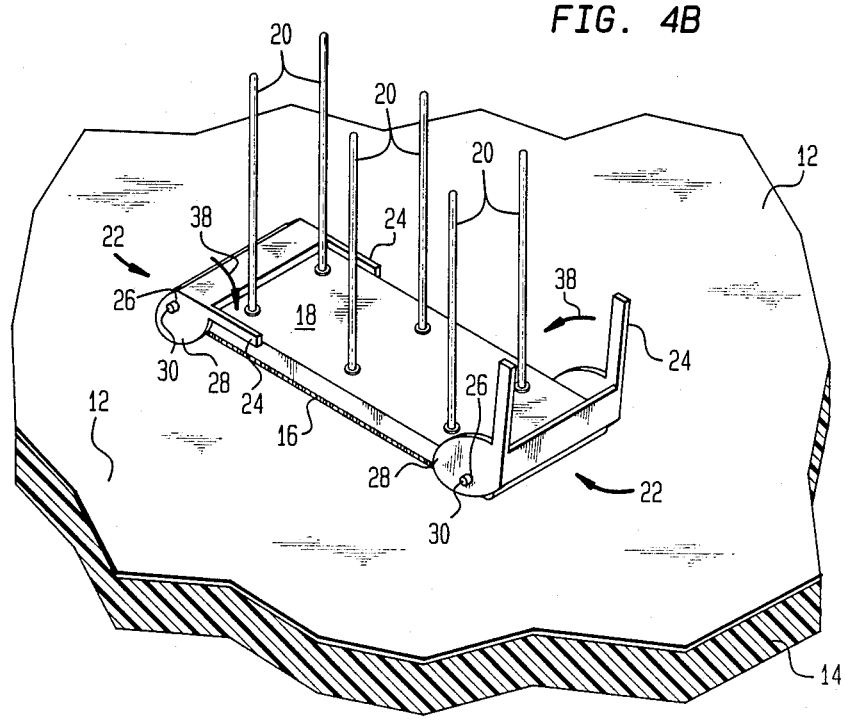
FIG. 4B illustrates the next step where the hook and loop displacement levers are turned downwardly causing the hook and loop materials to become moderately tensioned.

Initially, as shown in FIG. 4A, the hook material 16 on platform 18 is brought into contact with the loop material 12 on board 14. Platform 18 is pressed down and wiggled gently approximately 30° side to side in both directions as shown by arrow 36 two or three times in order to increase loop 12/hook 16 contact.

Second, lever arm 24 is rotated counterclockwise in the direction of arrow 38 from the 12 o'clock position to the 9 o'clock position thereby causing the platform 18 to move away from the board 14 by a displacement $D_{(d)}$ to a tensioned distance $D_{(t)}$. This movement, of course, causes the loop material 12 to pull away from the hook material 16 by the same displacement $D_{(d)}$ thereby placing the loop material 12 and hook material 16 under tension also referred to herein as pre-tension. Moreover, the outward displacement of platform 18 by $D_{(d)}$ causes more hooks 16 to engage some of the irregularly located loops 12 which otherwise might not have been engaged before. As shown in this mode the hooks and loops are pulled straight up thereby allowing more hooks and loops to become and remain locked together. In contrast, if attachment were made in the prior art fashion sideways pulling would allow all hooks which are pointed away from the direction of the pull to hold nothing and therefore only about 50% of the hooks and loops would be engaged. Moreover by placing the hooks and loops in pre-tension, it is possible to eliminate sideways sliding and therefore all hooks and loops are locked together regardless of their orientation. The distance $D_{(t)}$ and therefore displacement $D_{(d)}$ varies with different types of loop and hook materials 12 and 16, but is preferably enough to achieve maximum holding strength but not so much as to cause any significant number of loops 12 and hooks 16 to begin to disengage. In this mode it has been found that the sidewise shear holding strength increases in the neighborhood of 1500%. Moreover, the perpendicular holding strength, i.e. in a direction parallel to post 20, increases by approximately a factor of 20–25%.

Figure 4C:
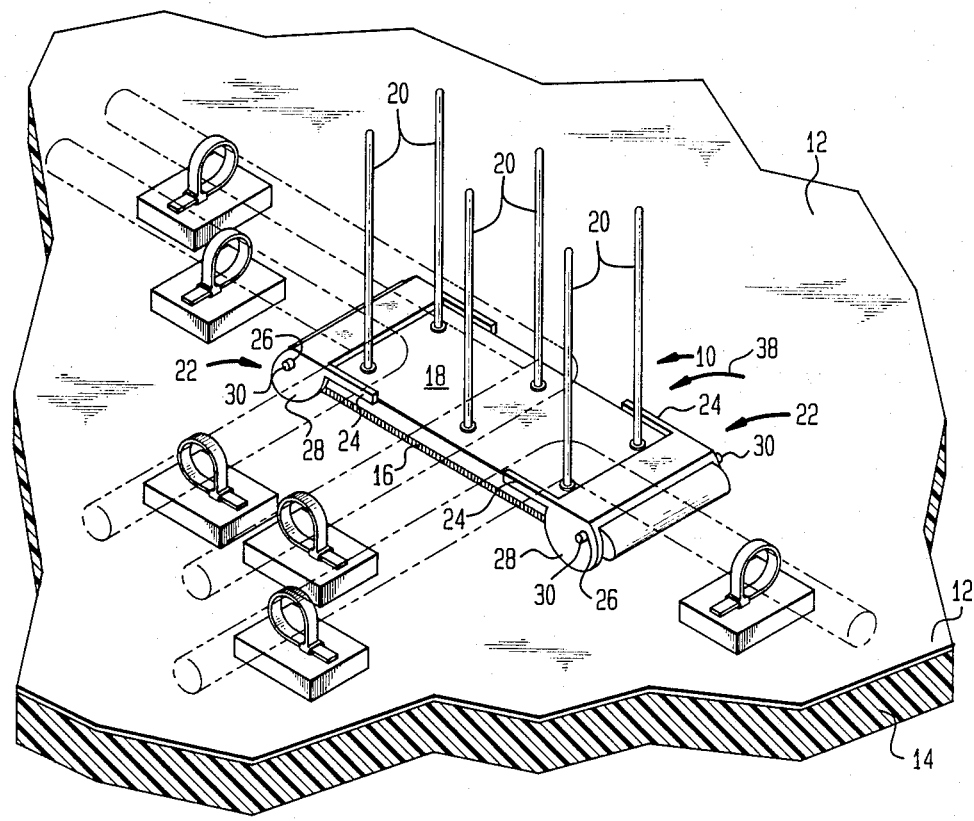
FIG. 4C illustrates the preferred embodiment of the invention after the hook and loop materials have been moderately pre-tensioned and wherein the invention is supporting a significant sidewise load.

FIG. 4C illustrates the present invention 10 supporting a sidewise load in the context of an electrical harness forming board 14 similar to the one shown in FIG. 1. According to the preferred embodiment of the invention, the posts 20 can now withstand the sidewise force of the wires that comprise the electrical harness whereas, previously, there was an increased likelihood that they could not withstand such sidewise forces.

Figure 4D:
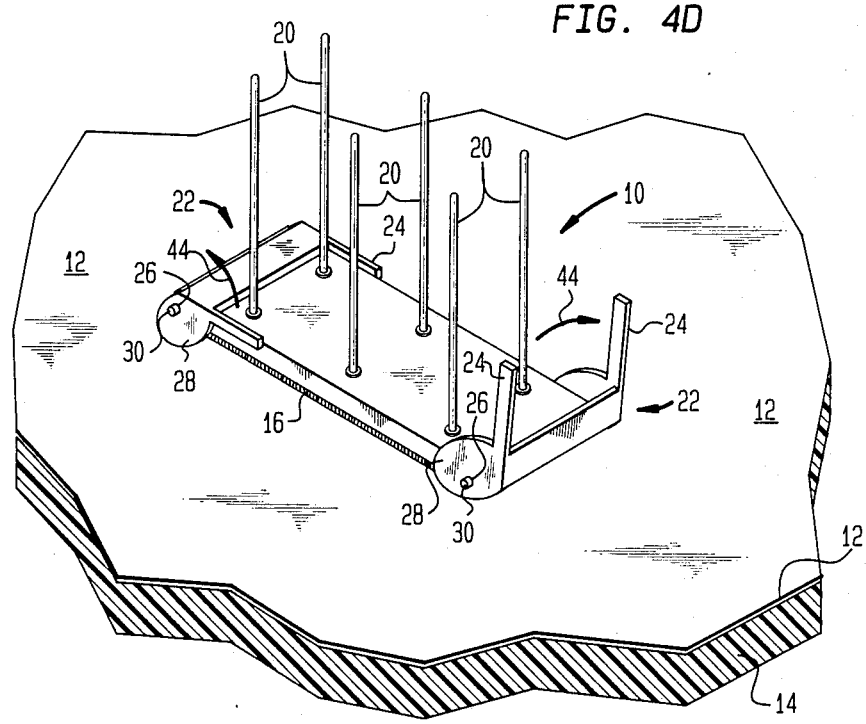
FIG. 4D illustrates the first step of disengaging the invention wherein the hook and loop displacement levers are returned to their original upright position thereby relieving the tension on the hook and loop materials.
Figure 4E:
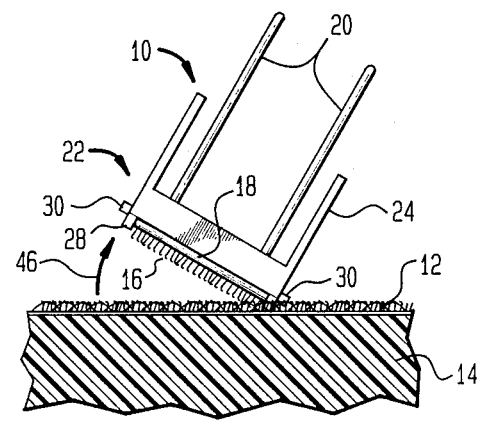
FIG. 4E illustrates the last step of the disengagement method in which the device is tipped and pulled away from the electrical wire harness forming board.

The first step in disengaging the invention 10 is illustrated in FIG. 4D. First, the lever arm 24 is rotated clockwise from the nine o'clock position to the twelve o'clock position in the direction of arrow 44. This is substantially the reverse of the action illustrated in FIG. 4B. The movement of lever arm 24 to the twelve o'clock position causes the platform 18 to move away from board 14 by displacement $D_{(d)}$, which also causes the pre-tension on the loop material 12 and the hook material 16 to significantly decrease. It also causes some of the loops 12 and hooks 16 to disengage as they relax, thereby decreasing their relative holding power.

Second, and last, the user normally pulls up on one edge of the platform 18 in the direction of arrow 46 thereby causing a separation line to appear at one edge and propagate across the loop 12/hook 16 interface until the invention 10 has been entirely removed.

Figure 5:
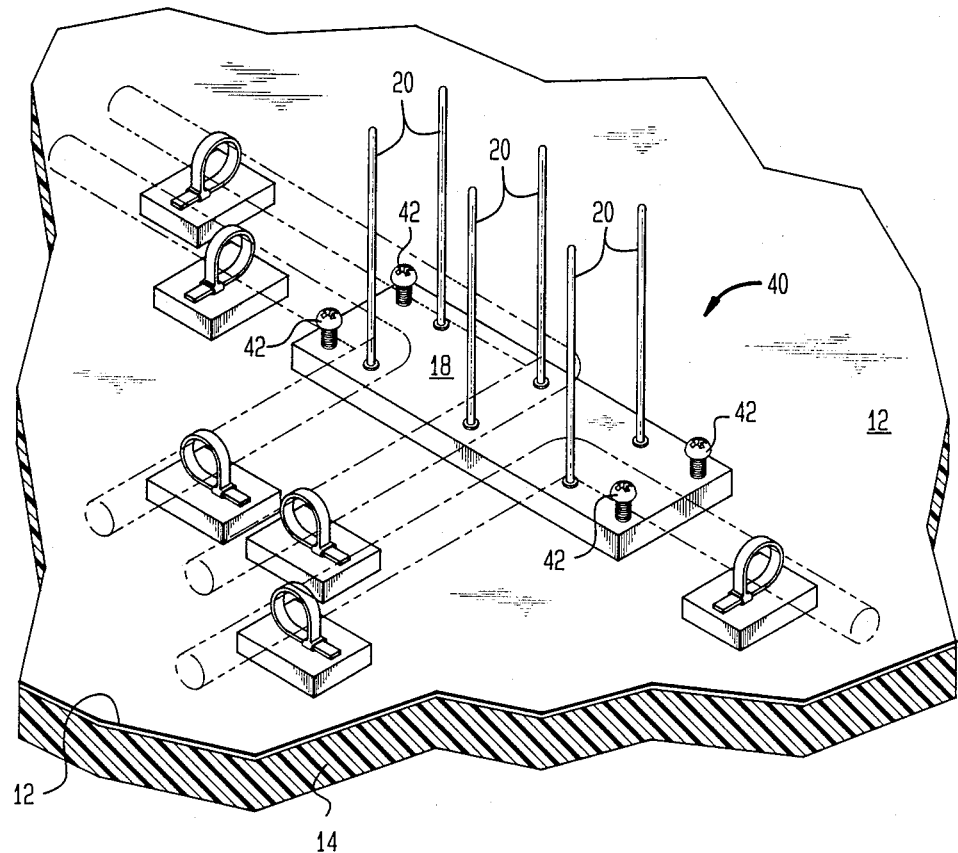
FIG. 5 illustrates an alternative embodiment of the hook and loop invention in which the displacement levers are replaced by a plurality of rotatable screws.

An alternative embodiment 40 of the present invention 10 is illustrated in FIG. 5. In this embodiment the two lever displacement devices 22 have been replaced by four machine screws 42 located respectively at each of the four corners of platform 18. Machine screws 42 are threadably received in holes in platform 18 so that they can extend below platform 18 to a distance of between 0" to $\frac{1}{4}''$. Alternative embodiment 40 is less expensive to manufacture, but a little bit more difficult to use. It finds the most utility in a context where it is not necessary to attach or remove it frequently from a board 14. Initially alternative embodiment 40 is brought into engagement with board 14 in a manner similar to that illustrated in FIG. 4A with regard to the preferred embodiment 10: After placing the alternative embodiment 40 against the board 14, the four screws 42 are tightened with very light pressure until the part will no longer rock side-by-side on the surface of the board 14. This achieves the same effect as when the lever arm 24 of the preferred embodiment 10 is rotated from the twelve o'clock position to the nine o'clock position. Alternative embodiment 40 is removed by rotating the machine screws 42 in the opposite direction thereby eliminating displacement $D_{(d)}$ and then twisting the platform 18 in a manner similar to that illustrated in FIG. 4E with respect to the preferred embodiment 10. In general the strength of such an interface will be up to sixteen times stronger than when using two surfaces with no pre-tension.

Figure 6:
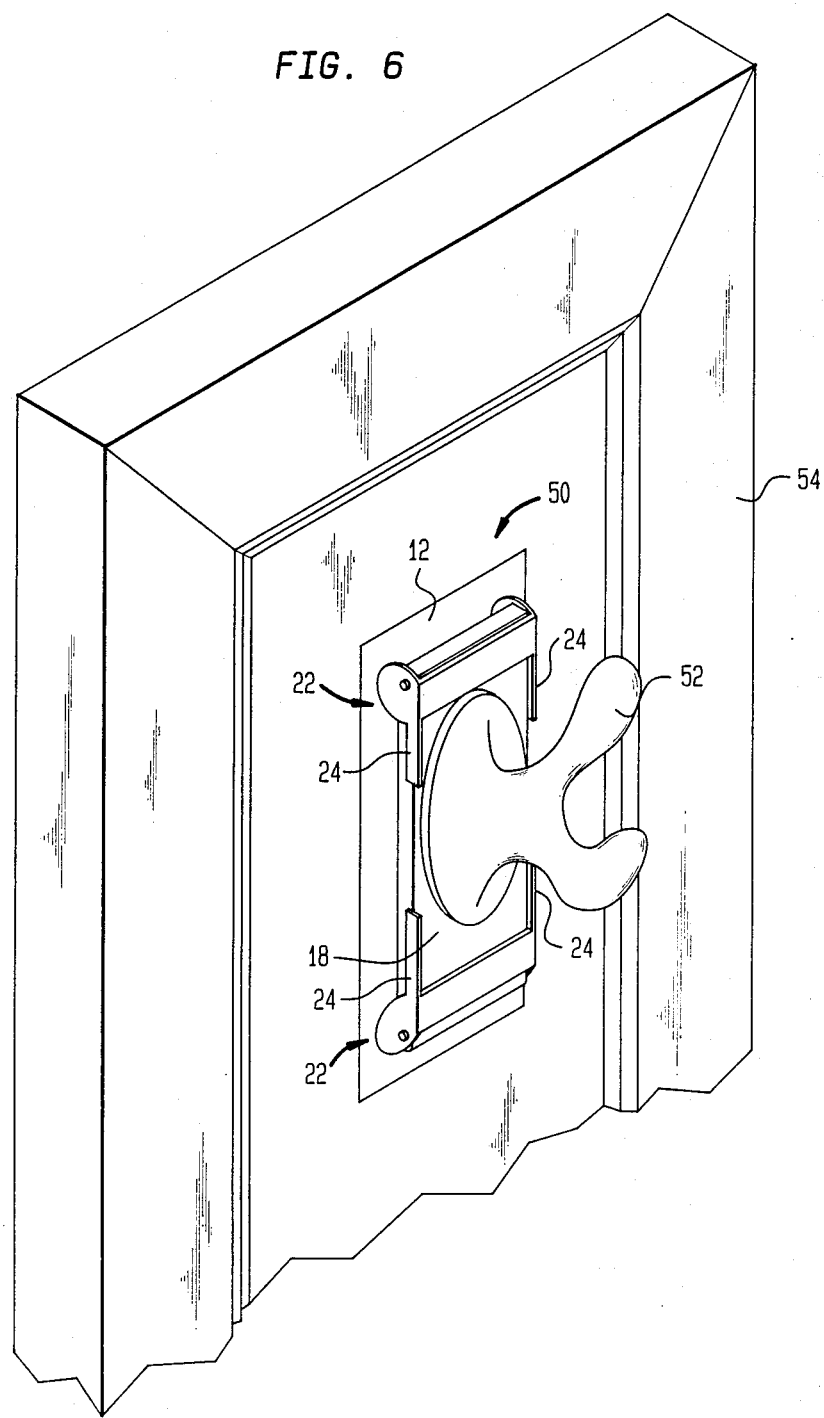
FIG. 6 illustrates another alternative embodiment in which the invention is employed to attach a clothes hook or the like to a vertical surface such as a door.

Thus far the invention has been described with respect to a context in which sidewise holding strength in the horizontal plane is required. However, because the increase in the sidewise holding strength is significant, it has been found that the basic invention has utility for supporting items in the vertical plane. For example, a clothes hook embodiment 50, illustrated in FIG. 6, shows that the basic invention can be employed on the backside of a door 54, or any other flat, vertical surface where a suitable patch of mating loop or hook material has been placed. The attachment and disengagement of the clothes hook embodiment 50 with its associated clothes hanger 52 is performed in the same manner as previously discussed with respect to the preferred embodiment 10 (FIGS. 4A-4E) or with respect to the alternative screw embodiment 40 illustrated in FIG. 5.

Similarly there are other applications for the basic invention. Those include, but are not necessarily limited to, the following: store displays (i.e. point of sale); modular book shelves; shoe ties; plate or souvenir hangars; locks for folding gate doors (e.g. childproof gates), etc.

The invention 10, 40 or 50 exhibits a substantially increased sideways resistance or holding strength by virtue of two factors. The first factor is that the process of tensioning the hooks and loops causes more hooks and loops to be firmly engaged. The tendency to disengage increases with the angle that the hooks assume with respect to the loops. The displacement levers or screws make it more difficult for the well engaged hooks and loops to disengage. The second factor is that the fulcrum point, which normally would lie near the center line in a non-tensioned device moves toward the outward leg, with a nontensioned device, thereby effectively employing an increased mechanical advantage to hold the device firmly in place.

FIGS. 7A-7F illustrate graphically how the phenomenon is believed to take place.

Figure 7A:
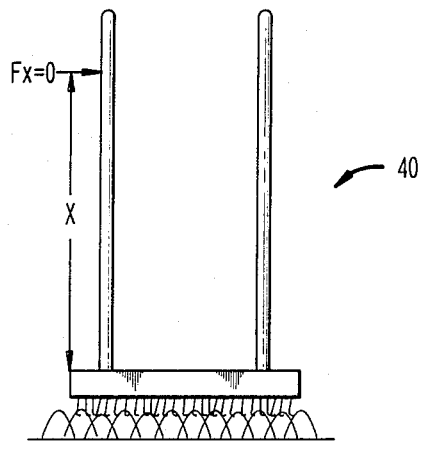
FIG. 7A is an end view of an earlier embodiment of the present invention shown without force applied.
Figure 7B:
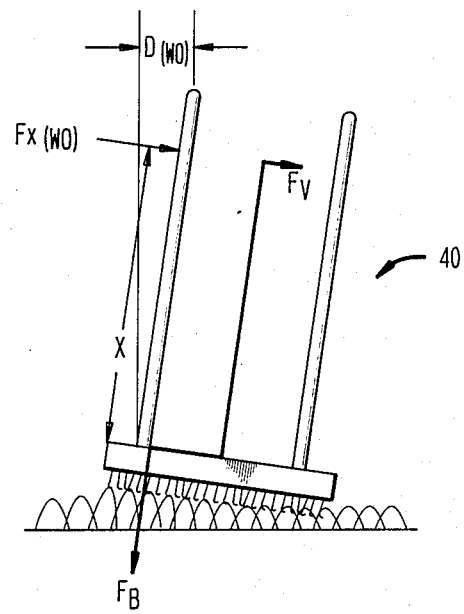
FIG. 7B illustrates the earlier embodiment of the invention illustrated in FIG. 7A without pre-tension and with a force applied to the side thereof resulting in a fairly large sidewise displacement.

FIGS. 7A illustrates the earlier embodiment of the invention 40 described in my copending application, shown in the non-pre-tensioned state. As shown in FIG. 7B, when a sideways force $Fx_{(WO)}$ is applied at a distance X above the base it causes a relatively large displacement, $D_{(wo)}$. The fulcrum line passes through the normal center line of 40. Because the tensioning devices are not employed, it is possible for the platform to tip at a greater angle than is the case when the tensioning devices are used. This causes a number of the hook and loop engagements to disengage since they are free to assume their normal positions.

The holding force of the device 40 is equal to:

$$F_B = nH$$

where H = the holding strength of each individual hook; and, n = the number of hooks engaged.
Since the fulcrum point passes through the approximate centerline of the holding apparatus 40, it further amplifies the leverage exerted by the force $Fx_{(WO)}$.

Figure 7C:
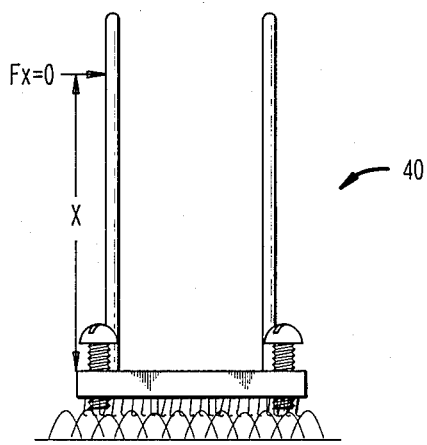
FIG. 7C illustrates the improved embodiment of the invention in the pre-tensioned mode with no force applied.
Figure 7D:
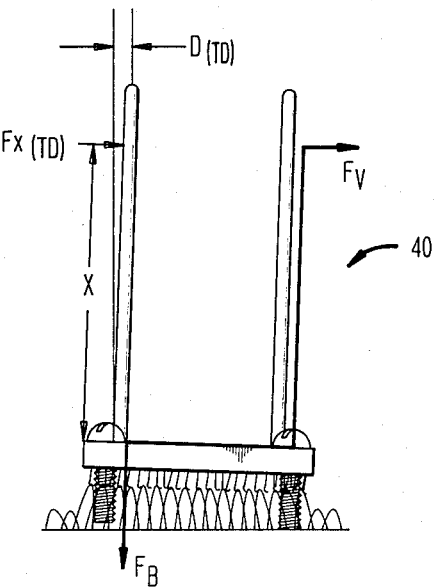
FIG. 7D illustrates the improved embodiment of the invention shown in FIG. 7C with a force applied and resulting in a fairly small sidewise displacement.

In contrast, FIGS. 7C and 7D illustrate the case where pre-tensioning devices are employed. FIG. 7C illustrates the circumstance in which the force Fx is 0.

In FIG. 7D a force $Fx_{(TD)}$ is applied a distance X above the platform. In this case the force $Fx_{(WO)}$ shown in FIG. 7B is the same as the force $Fx_{(TD)}$ shown in FIG. 7D. The displacement $D_{(TD)}$ is smaller than the displacement $D_{(WO)}$ for the same force. This in part is a result of the fact that the angle between the platform and the base material is smaller, thereby permitting fewer hooks and loops to disengage. In addition the effective fulcrum in the pre-tensioned device shown in FIG. 7D has moved to the outer edge thereby lessening the mechanical advantage that the force $Fx_{(TD)}$ has on the overall device.

The table below indicates the dramatic increase in sideways holding strength or resistance in response to a force applied to a post on a device both with and without tension.

| FORCE VS. DISPLACEMENT TABLE | | | | |
|---|---|---|---|---|
| Displacement | 1/32" | 1/16" | ⅛" | Break-Off |
| $Fx_{(WO)}$ | 0.50 lbs. | 0.75 lbs. | 1.25 lbs. | 7.5 lbs. |
| $Fx_{(TD)}$ | 7.00 lbs. | 12.50 lbs. | 18.00 lbs. | 24 lbs. |

It is clear from the foregoing that prior to break off the increase in holding strength ranges from approximately 14:1 to 16.6:1 or an approximate 1500% increase.

FIGS. 7E and 7F illustrate the increase of holding power exhibited by the invention under the influence of an upward force In FIG. 7E upward force $Fy_{(WO)}$ is applied to a non-pre-tensioned platform 40. Under such circumstances the maximum force that can be resisted before breakoff is approximately 17 lbs. However, when the device 40 is tensioned as shown in FIG. 7F, the upward force $Fy_{(TD)}$ increases to as much as 21 lbs. before separation. While the 23.5% increase in holding strength is not as dramatic as the 1400-1660% increase in sideways holding strength or resistance, it nevertheless is noticeable and probably results from the fact that a greater number of hooks and loops are more firmly engaged when properly pre-tensioned as shown in FIG. 7F than when they are under the conventional tension as shown in FIG. 7E.

While the invention has been described with reference to the preferred embodiment thereof it will be appreciated by those of ordinary skill in the art that various changes can be made to the parts and basic structure of the invention without departing from the scope and spirit of the invention as a whole.

I claim:

1. An apparatus for increasing the holding strength of a first and second type of material which are matable with each other and in which said second type of material is attachable to a structure, said apparatus comprising:
   a platform firmly attached to said first type of material; and,
   displacement means comprising at least two screw means threadably receivable in said platform for displacing said first and second types of material away from each other when said screw means is turned after initial engagement of said first and second type of materials,
   wherein one of said materials comprises a hook type material and the other of said materials comprises a loop type material for engaging said hook type material and wherein displacement by said displacement means causes said hook and loop materials to more firmly engage each other.

2. An apparatus for increasing the holding strength of a first and second type of material which are matable with each other and in which said second type of material is attachable to a structure, said apparatus comprising:

a platform attached to said first type of material; and, at least two displacement means attached to said platform for displacing said first and second type of materials in opposite directions after initial engagement of said first and second types of materials; and object holding means attached to said platform and located on the side of said platform opposite from the side attached to said first type of material, wherein one of said materials comprises a hook type material and the other of said materials comprises a loop type material for engaging said hook type material and wherein said displacement means tensions said hook and loop type materials with respect to each other to more firmly engage each other but not so much as to cause a substantial disengagement of said hook and loop type materials.

3. The apparatus of claim 2 wherein said object holding means comprises a wire holding means for holding at least one wire on a wire harness forming board.

4. The apparatus of claim 3 wherein said wire holding means comprises at least one post.

5. The apparatus of claim 2 wherein said object holding means comprises a hook.

6. The apparatus of claim 5 wherein said hook comprises a clothes hook.

7. An apparatus for increasing the holding strength of a first and second type of material which are matable with each other and in which the second type of material in attachable to a structure, said apparatus comprising:

a platform attached to said first type of material; and, displacement means attached to said platform for displacing said first and second types of materials in opposite directions after initial engagement of said first and second type of materials, wherein one of said materials comprises a hook type material and the other of said materials comprises a loop type material for engaging said hook type material and wherein displacement by said displacement means causes said hook and loop type materials to more firmly engage each other and further wherein the radius of said hook section of said hook type material is approximately equal to the displacement caused by said displacement means.

8. An apparatus for increasing the holding strength of a first and second type of material which are matable with each other and in which said second type of material is attachable to a structure, said apparatus comprising:

a platform attached to said first type of material; and, displacement means attached to said platform for displacing said first and second type of materials in opposite directions after initial engagement of said first and second type materials, said displacement means comprising at least two lever means rotatably attached to said platform, said lever means including a lever arm section and a leg section rigidly attached to said lever arm section, said lever means being located outside of the area where said first and second types of materials engage each other, wherein one of said materials comprises a hook type material and the other of said materials comprises a loop type material for engaging said hook type of material and wherein rotation of said lever arm section causes said leg section to rotate in a direction such that said hook and loop type materials are displaced away from each other by a predetermined distance D such that said lever means tensions said hook and loop type materials with respect to each other to more firmly engage each other but not so much to cause a substantial disengagement of said hook and loop type materials.

9. An apparatus for increasing the holding strength of a first and second type of matable means which are resiliently matable with each other and in which said second type of matable means is attachable to a structure, said apparatus comprising:

a platform attached to said first type of matable means; and, displacement means attached to said platform for displacing said first and second type of matable means in opposite directions after initial engagement of said first and second type of matable means, wherein said displacement means comprises at least two screws threadably received in said platform, wherein one of said matable means comprises a hook type means and the other of said matable means comprises a loop type means for engaging said hook type means and wherein the turning of said screws causes said platform to move in a direction which displaces said first and second type of matable means away form each other thereby providing tension upon said hook and loop type of matable means with respect to each other but not so much as to cause a substantial disengagement of said hook and loop type matable means.

10. An apparatus for increasing the holding strength of a first and second type of matable means which are resiliently matable with each other and in which said second matable means is attachable to a structure, said apparatus comprising:

a platform attached to said first type of matable means; and, displacement means attached to said platform for displacing said first and second type of matable means in opposite directions after initial engagement of said first and second type of matable means, said displacement means comprising at least two lever means rotatably attached to said platform, said lever means including a lever arm section and a leg section rigidly attached to said lever arm section, said lever means being located outside of the area where said first and second matable means engage each other, wherein one of said matable means comprises a hook type means and the outer of said matable means comprises a loop type means for engaging said hook type means and wherein rotation of said lever arm section causes said leg section to rotate in a direction such that said hook and loop type means are displaced away from each other by a predetermined distance D thereby tensioning said hook and loop means with respect to each other to more firmly engage each other but not so much as to cause a substantial disengagement of said hook and loop type means.

* * * * *